United States Patent
Konishi (10) Patent No.: US 8,963,711 B2
(45) Date of Patent: Feb. 24, 2015

(54) PRESENCE DECISION APPARATUS, PRESENCE DECISION METHOD, AND PROGRAM

(75) Inventor: Yusuke Konishi, Tokyo (JP)

(73) Assignee: NEC Corporation, Tokyo (JP)

( * ) Notice: Subject to any disclaimer, the term of this patent is extended or adjusted under 35 U.S.C. 154(b) by 230 days.

(21) Appl. No.: 13/812,205

(22) PCT Filed: Jun. 16, 2011

(86) PCT No.: PCT/JP2011/063774
§ 371 (c)(1),
(2), (4) Date: Jan. 25, 2013

(87) PCT Pub. No.: WO2012/014593
PCT Pub. Date: Feb. 2, 2012

(65) Prior Publication Data
US 2013/0127619 A1 May 23, 2013

(30) Foreign Application Priority Data

Jul. 26, 2010 (JP) .................. 2010-166649

(51) Int. Cl.
*G08B 21/00* (2006.01)
*G08B 21/22* (2006.01)
*G06F 1/32* (2006.01)

(52) U.S. Cl.
CPC .............. *G08B 21/22* (2013.01); *G06F 1/3231* (2013.01)

USPC ............................................ 340/540; 340/500

(58) Field of Classification Search
CPC ......... G08B 21/22; G08B 21/00; G08B 21/18
USPC ........................................................ 340/540
See application file for complete search history.

(56) References Cited

U.S. PATENT DOCUMENTS

2007/0188470 A1 * 8/2007 Lee et al. ...................... 345/167

FOREIGN PATENT DOCUMENTS

| JP | 05-011713 A | 1/1993 |
| JP | 10-268984 A | 10/1998 |
| JP | 11-296478 A | 10/1999 |
| JP | 2000-075964 A | 3/2000 |
| JP | 2010-067104 A | 3/2010 |
| WO | 2004/053665 A1 | 6/2004 |

* cited by examiner

*Primary Examiner* — Kerri McNally
(74) *Attorney, Agent, or Firm* — Sughrue Mion, PLLC (57) ABSTRACT

A detection data acquisition unit acquires detection data indicating the detection results from a human sensor. An operation data acquisition unit acquires operation data indicating the presence or absence of operation input to a prescribed machine. A detection data validity determining unit determines from the detection data and the operation data, the validity of the detection data. A presence determination unit determines from the detection data, the operation data, and the validity determination results with respect to the detection data, whether or not an operator is within the area of a prescribed machine.

15 Claims, 7 Drawing Sheets

PRESENCE DECISION APPARATUS, PRESENCE DECISION METHOD, AND PROGRAM

This application is a National Stage Entry of PCT/JP2011/0063774, filed Jun. 16, 2011, which claims priority from Japanese Patent Application No. 2010-166649, filed on Jul. 26, 2010, the contents of which are incorporated herein by reference in their entirety.

TECHNICAL FIELD

The present invention relates to a presence decision apparatus, a presence decision method, and a program.

BACKGROUND ART

Systems have been implemented that have a power-saving function for electronic apparatuses such as televisions and personal computers, the function reducing consumed power by deciding whether a user is present based on existence or nonexistence of a user's operation, and controlling a power source in response to a result of the decision.

Other systems have been also implemented that reduce consumed power by deciding whether a user is present around an electronic apparatus using a human presence sensor, and controlling a power source in response to a result of the decision.

For example, PTL 1 describes a technique involving deciding whether a user is present based on information on existence/nonexistence of an operation by an operation input device provided in an electronic apparatus to control a power source of the electronic apparatus.

PTLs 2 and 3 describe techniques involving deciding whether a user is present based on a result of detection by a human presence sensor provided in an electronic apparatus to control a power source of the electronic apparatus.

CITATION LIST

Patent Literature

PTL 1: JP P2000-075964A
PTL 2: JP P1998-268984A
PTL 3: JP P1993-11713A

SUMMARY OF INVENTION

Technical Problem

The systems for deciding whether a user is present around an electronic apparatus according to existence or nonexistence of a user's operation as described above, however, cannot correctly decide the presence of a user when the user is not operating the electronic apparatus even if he/she is present around the electronic apparatus.

On the other hand, the human presence sensors tend to be affected by the condition of an object to be detected and/or the surrounding environment depending upon the operation principle and properties of the sensors. For example, an infrared-based distance sensor is comprised of a light-emitting element for emitting infrared rays and a light-receiving element for receiving infrared rays, and detects a distance from the sensor to an object based on the amount of infrared light emitted from the light-emitting element, reflected at the object, and received by the light-receiving element. This poses a problem that whether a user is present around an electronic apparatus cannot be correctly decided from a result of detection by the distance sensor in case that some object other than the user is placed within the detection coverage of the distance sensor and/or in case that the distance sensor does not normally function due to a smear of its lens or the like.

The present invention has been made in view of such a problem, and its object is to provide a presence decision apparatus, a presence decision method, and a program capable of providing a highly reliable result of decision as to whether a user is present in a predetermined area.

Solution to Problem

The present invention is a presence decision apparatus characterized in comprising: detected data validity deciding means for, based on detected data indicating a result of detection by a sensor for detecting a presence of an object and, operation data indicating existence or nonexistence of an operation input to a predetermined apparatus, deciding validity of said detected data; and presence deciding means for, based on said detected data, said operation data, and a decision result of validity of said detected data, deciding whether a user is present around said predetermined apparatus.

The present invention is a presence decision method characterized in comprising: a detected data validity deciding step of, based on detected data indicating a result of detection by a sensor for detecting a presence of an object and, operation data indicating existence or nonexistence of an operation input to a predetermined apparatus, deciding validity of said detected data; and a presence deciding step of, based on said detected data, said operation data, and a decision result of validity of said detected data, deciding whether a user is present around said predetermined apparatus.

The present invention is a program for causing a computer to execute: detected data validity deciding processing of, based on detected data indicating a result of detection by a sensor for detecting a presence of an object, and operation data indicating existence or nonexistence of an operation input to a predetermined apparatus, deciding validity of said detected data; and presence deciding processing of, based on said detected data, said operation data, and a decision result of validity of said detected data, deciding whether a user is present around said predetermined apparatus.

Advantageous Effects of Invention

According to the present invention, a highly reliable result of decision as to whether a user is present in a predetermined area can be obtained.

DESCRIPTION OF EMBODIMENTS

Now several embodiments of the present invention will be described with reference to the accompanying drawings.

(First Embodiment)

Figure 1:
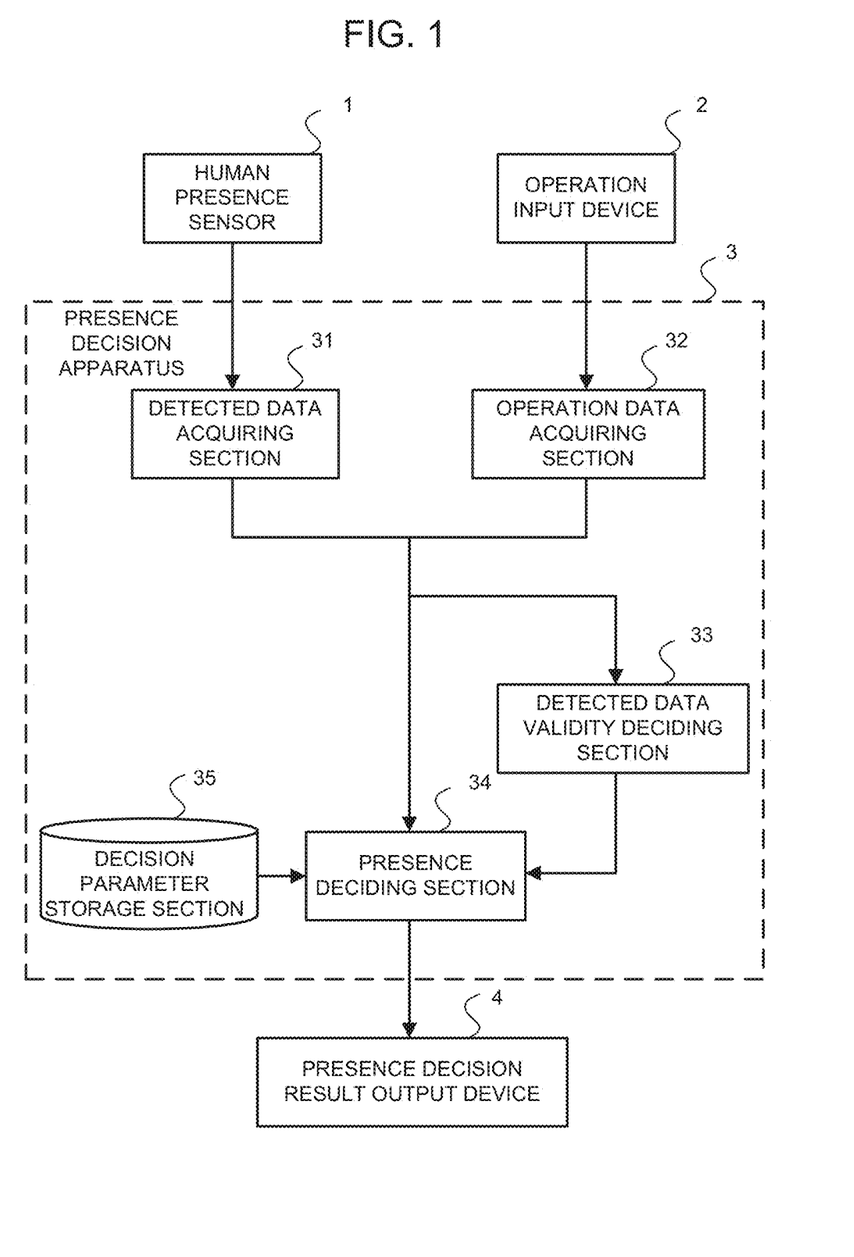
FIG. 1 is a block diagram of a presence decision system in accordance with a first embodiment of the present invention.

FIG. 1 is a block diagram of a presence decision system in accordance with a first embodiment of the present invention. As shown, the presence decision system in accordance with the first embodiment includes a human presence sensor 1, an operation input device 2, a presence decision apparatus 3, and a presence decision result output device 4.

The human presence sensor 1 detects the presence of an object around an electronic apparatus. The human presence sensor 1 includes a distance sensor and/or a motion sensor. The distance sensor detects a distance from the sensor to an object to be detected using infrared rays or ultrasound. In case that an object such as a person is present within a detection coverage of the distance sensor, the distance to the object can be detected to decide that some object is present at the detected distance. The motion sensor detects motion of an object around the sensor using a pyroelectric sensor, a microwave radar or the like. In case that an object such as a person is present within the detection coverage of the motion sensor, motion of the object can be detected to decide that some object is present within the detection coverage of the motion sensor. The human presence sensor 1 may be installed wherever it can detect a presence of an object around an electronic apparatus, and it is not necessary to install it in the electronic apparatus itself.

The operation input device 2 is a device for providing input to an electronic apparatus, and is operated by a user of the electronic apparatus. The operation input device 2 comprises devices such as a remote controller, a keyboard, a mouse, a touch panel, a switch, a button or the like.

The presence decision apparatus 3 includes a detected data acquiring section 31, an operation data acquiring section 32, a detected data validity deciding section 33, a presence deciding section 34, and a decision parameter storage section 35.

The detected data acquiring section 31 acquires a result of detection (detected data) by the human presence sensor 1. In case that the human presence sensor 1 is a distance sensor, the detected data indicates a distance value from the sensor to an object to be detected or an output value corresponding to the distance from the sensor to the object to be detected. In case that the human presence sensor 1 is a motion sensor, the detected data indicates existence/nonexistence of motion of an object around the sensor or an output value corresponding to the intensity of motion. Acquisition of the detected data from the human presence sensor 1 may be achieved by making a request to the human presence sensor 1 at certain time intervals, or alternatively, detected data supplied by the human presence sensor 1 may be received when any change is detected by the human presence sensor 1 (the detected value has exceeded a predetermined range, for example).

The operation data acquiring section 32 decides whether input to the electronic apparatus by an operation of the operation input device 2 exists within a predetermined period of time, and acquires a result of the decision (operation data). The decision as to whether operation input exists may be made on a single operation input device 2 or a plurality of operation input devices 2.

From the detected data acquired by the detected data acquiring section 31 and the operation data acquired by the operation data acquiring section 32, the detected data validity deciding section 33 decides whether the detected data is valid. Details of the validity deciding processing by the detected data validity deciding section 33 will be discussed later.

The presence deciding section 34 decides whether a user is present around an electronic apparatus from the detected data acquired by the detected data acquiring section 31, the operation data acquired by the operation data acquiring section 32, and a result of the decision acquired by the detected data validity deciding section 33. Details of the presence deciding processing by the presence deciding section 34 will be discussed later.

The decision parameter storage section 35 stores a decision parameter for use in the presence deciding processing by the presence deciding section 34.

The presence decision result output device 4 outputs a result of the decision of the presence deciding processing by the presence decision apparatus 3.

Next, the validity deciding processing by the detected data validity deciding section 33 will be described with reference to FIG. 2.

The detected data validity deciding section 33 refers to detected data acquired from the human presence sensor 1, and decides whether motion of an object to be detected is found within the detection coverage of the human presence sensor 1 (Step A1). In particular, in case that the human presence sensor 1 is a distance sensor, a difference between detected data (distance) stored in a memory area at the time of the previous decision and that at the time of the latest decision is determined, and it may be decided that motion of an object is found when the difference (the amount of a change) is greater than a specified threshold. Alternatively, detected data at the times of a plurality of decisions in the past may be stored in a memory area as a history, and it may be decided that motion of an object is found when an amplitude (a difference between a maximum and a minimum) or a variance of the detected data included in the history is greater than a specified threshold. In case that the human presence sensor 1 is a motion sensor, detected data (indicating existence or nonexistence of motion or intensity of motion) at the time of the latest decision may be used to decide whether motion is found. Moreover, detected data at the times of a plurality of decisions in the past may be stored in a memory area as a history, and it may be decided that motion is found when the number of detected data elements for which it can be decided that motion is found among the data elements included in the history is greater than a specified threshold.

In case that it is decided that motion is found at Step A1, the detected data validity deciding section 33 decides that the detected data from the human presence sensor 1 is valid and outputs a result of decision "valid" (Step A3).

In case that it is decided that no motion is found at Step A1, the detected data validity deciding section 33 refers to operation data to decide whether an operation for the electronic apparatus is found (Step A2). In particular, whether an operation is found may be decided based on the latest operation data. Moreover, operation data at the times of a plurality of decisions in the past may be stored in a memory area as a history, and it may be decided that motion is found when the number of operation data elements indicating that operation input exists among the data elements included in the history is greater than a specified threshold.

In case that it is decided that an operation for the electronic apparatus is found at Step A2, the detected data validity deciding section 33 decides that the detected data from the human presence sensor 1 is invalid and outputs a result of decision "invalid" (Step A4).

On the other hand, in case that it is decided that no operation for the electronic apparatus is found at Step A2, the section 33 makes no decision as to whether the detected data from the human presence sensor 1 is valid and outputs a result of decision "unknown" (Step A5).

Thus, in case that input by an operation of the operation input device 2 is made to the electronic apparatus even though no motion is detected by the human presence sensor 1, the detected data validity deciding section 33 decides that some obstacle other than a user is present within the detection coverage of the human presence sensor 1 or the human presence sensor 1 does not detect a user due to a malfunction of the human presence sensor 1, and outputs that the detected data from the human presence sensor 1 is invalid. On the other hand, in case that some motion is detected by the human presence sensor 1, the section 33 decides that the human presence sensor 1 operates normally and outputs that the detected data from the human presence sensor 1 is valid.

Next, presence deciding processing by the presence deciding section 34 will be described with reference to FIG. 3.

The presence deciding section 34 updates a validity value for detected data based on a result of decision as to validity of the detected data by the detected data validity deciding section 33 (Step B1). The validity value for detected data assumes a value of "valid" or "invalid," and is retained in a memory area over processing for a plurality of decisions. In case that the validity value for detected data presented by the result of decision by the validity deciding processing is "valid," the presence deciding section 34 stores the latest validity value as "valid;" in case that the validity value for detected data presented by the result of decision by the validity deciding processing is "invalid," the section 34 stores the latest validity value as "invalid;" or in case that the validity value for detected data is "unknown," the validity value for detected data is not updated.

Similar to Step A2 of the validity deciding processing described above, the presence deciding section 34 refers to operation data, and decides whether an operation for an electronic apparatus is found (Step B2).

In case that it is decided that an operation for the electronic apparatus is found at Step B2, the presence deciding section 34 decides that a user is present and outputs a result of decision "present" (Step B6).

In case that it is decided that no operation for the electronic apparatus is found at Step B2, the presence deciding section 34 checks a validity value for detected data retained in the memory area (Step B3), and in case that the validity value is "invalid," it outputs a result of presence decision "unknown" (Step B8). The value "unknown" indicates that the presence of a user cannot be correctly decided.

In case that the validity value is "valid" at Step B3, the presence deciding section 34 refers to detected data acquired from the human presence sensor 1 similar to Step A1 of the validity deciding processing described above, and decides whether motion of an object to be detected is found within the detection coverage of the human presence sensor 1 (Step B4). A parameter (threshold) for use in the decision is stored in the decision parameter storage section 35 beforehand, and the parameter is loaded and used.

At Step B4, in case that it is decided that motion is found, the presence deciding section 34 decides that a user is present around the electronic apparatus and outputs a result of decision "present" (Step B6).

In case that it is decided that no motion is found at Step B4, the presence deciding section 34 refers to detected data, and decides whether any object is present within the predetermined coverage (Step B5). In particular, in case that the human presence sensor 1 is a distance sensor, it may be decided that an object is present within the predetermined coverage when detected data (a distance from the sensor) at the time of decision is smaller than a specified threshold, or it may be decided that no object is present when detected data is greater than the threshold. Alternatively, detected data at the times of a plurality of decisions in the past may be retained in a memory area as a history, and it may be decided that an object is present within the predetermined coverage when the average, median, minimum or maximum of the detected data included in the history is smaller than a specified threshold. At that time, a parameter (threshold) for use in the decision is stored in the decision parameter storage section 35 beforehand, and the parameter is loaded and used. Moreover, in case that the human presence sensor 1 is a motion sensor, a result of decision may be always "no object" at this step.

In case that it is decided that an object is present at Step B5, the presence deciding section 34 decides that a user is present around the electronic apparatus and outputs a result of decision "present" (Step B6).

In case that it is decided that no object is present at Step B5, the presence deciding section 34 decides that no user is present around the electronic apparatus and outputs a result of decision "absent" (Step B7).

Thus, in case that detected data is decided to be unreliable for a reason such as that some obstacle other than a user is present within the detection coverage of the human presence sensor 1 or the operation of the human presence sensor 1 is abnormal, the presence deciding section 34 outputs that whether a user is present around the electronic apparatus is unknown to thereby increase reliability of a result of the presence decision.

As described above, according to the embodiment of the present invention, validity of a result of detection by the human presence sensor 1 is decided using detected data indicating a result of detection by the human presence sensor 1 and operation data indicating existence or nonexistence of an operation of the operation input device 2, whereby decision as to whether a user is present around an electronic apparatus can be avoided in such a case that any obstacle other than a user is present within the detection coverage of the human presence sensor 1 or the operation of the human presence sensor 1 is abnormal, and errors in presence decision can be thus reduced.

(Second Embodiment)

Figure 4:
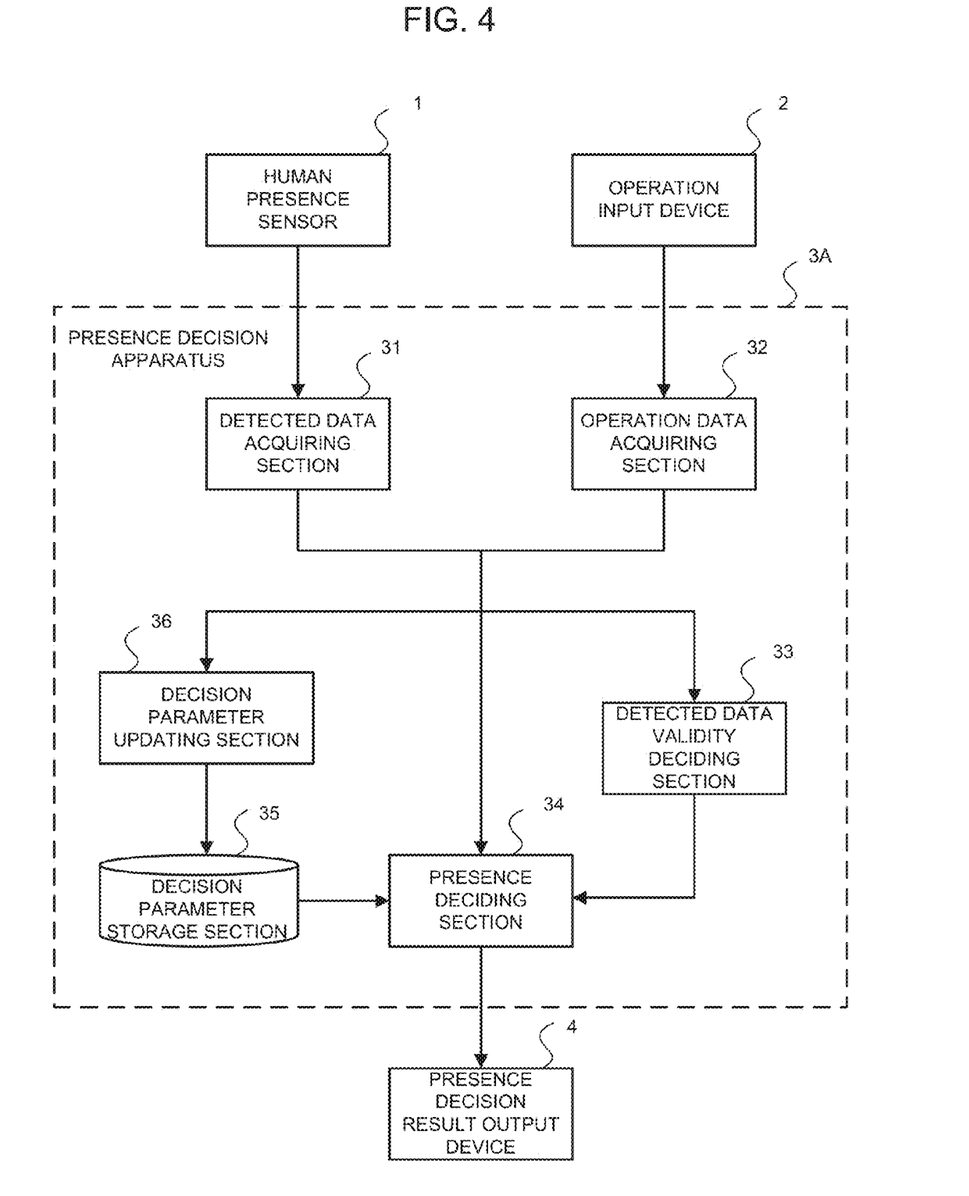
FIG. 4 is a block diagram of a presence decision system in accordance with a second embodiment of the present invention.

Next, a presence decision system in accordance with a second embodiment will be described. FIG. 4 is a block diagram of a presence decision system in accordance with the second embodiment of the present invention. In this embodiment, parts having similar functions to those of the first embodiment are designated by similar reference symbols, and description thereof will be omitted.

A presence decision apparatus 3A in the presence decision system in accordance with the second embodiment further includes a decision parameter updating section 36, in addition to the components of the presence decision apparatus 3 in the first embodiment.

The decision parameter updating section 36 updates a decision parameter stored in the decision parameter storage section 35 for use in the presence deciding section 34 from the detected data obtained by the detected data acquiring section 31 and the operation data obtained by the operation data acquiring section 32.

Figure 5:
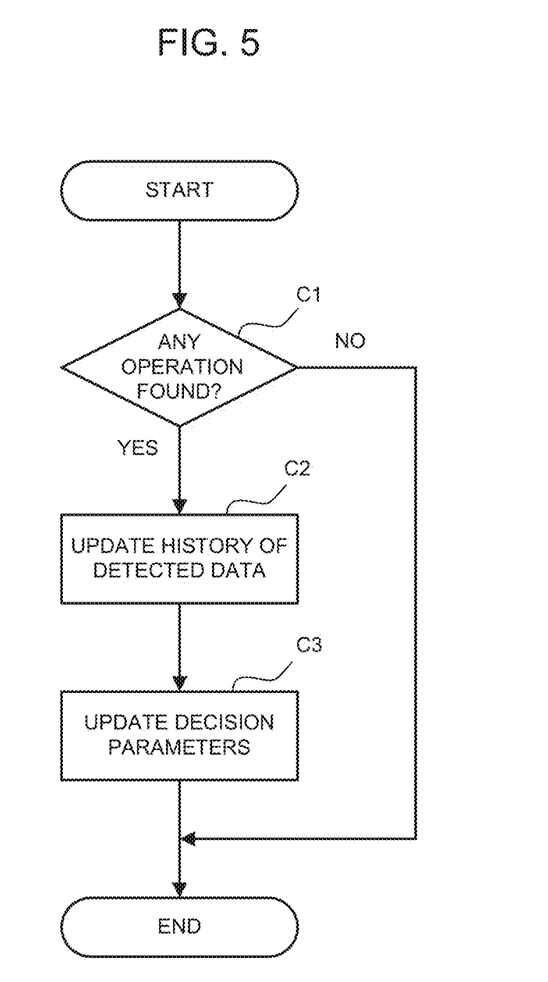
FIG. 5 is a flow chart for explaining an operation of a decision parameter updating section.

An operation of the decision parameter updating section 36 will be described with reference to FIG. 5.

Figure 2:
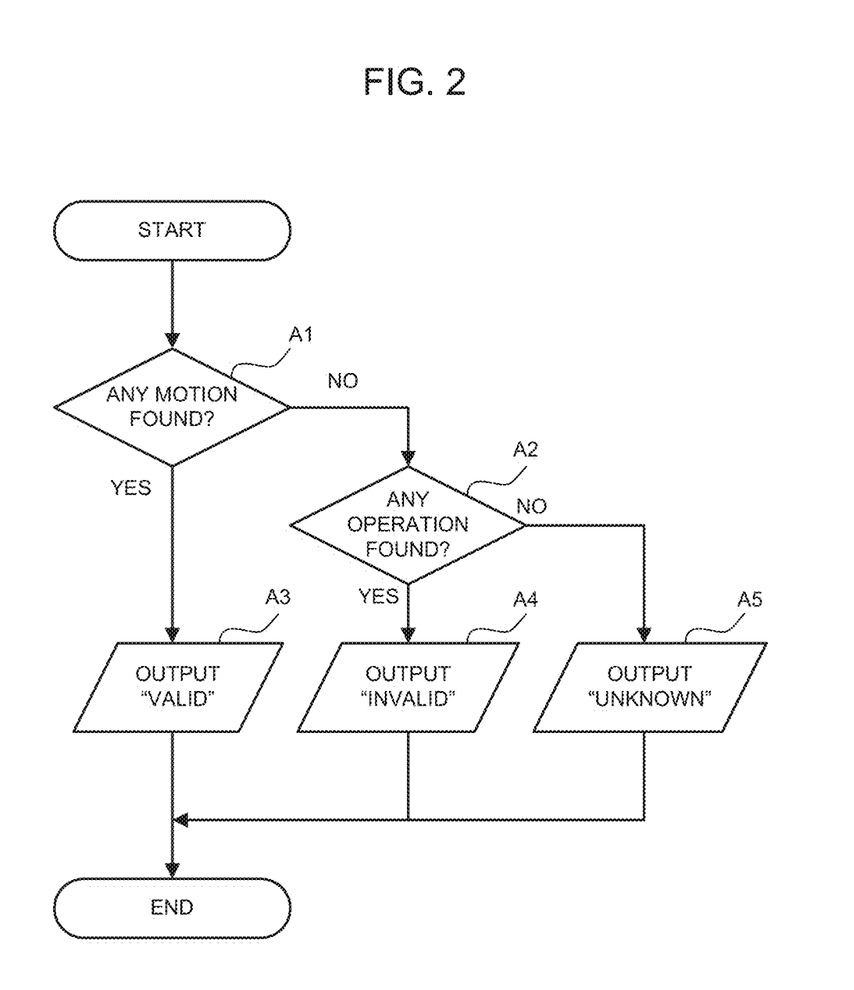
FIG. 2 is a flow chart for explaining validity deciding processing.

Similar to Step A2 in FIG. 2, the decision parameter updating section 36 refers to the operation data, and decides whether an operation for an electronic apparatus is found (Step C1).

In case that it is decided that an operation for an electronic apparatus is found at Step A2, the decision parameter updating section 36 adds the detected data to a detected data history used for updating the decision parameter and stores it (Step C2).

Then, the decision parameter updating section 36 determines a decision parameter based on the detected data history, and updates the decision parameter stored in the decision parameter storage section 35 (Step C3).

Figure 3:
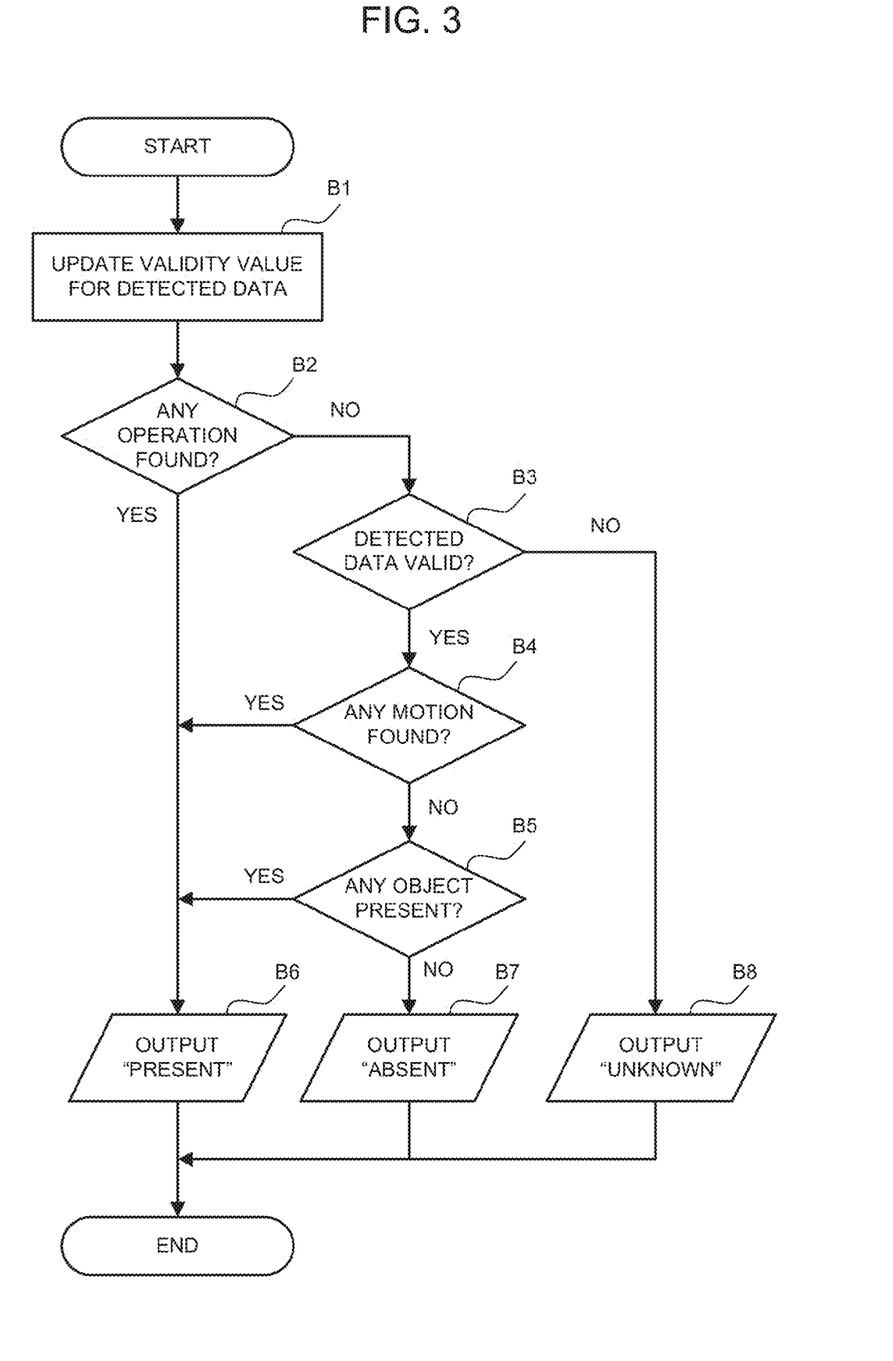
FIG. 3 is a flow chart for explaining presence deciding processing.

In case that the human presence sensor 1 is a distance sensor, the determined decision parameter may be a threshold (distance), for example, for use in the decision at Step B5 in FIG. 3 (decision as to whether any object is present within the detection coverage of the sensor). In this case, a value of the detected data included in the history that indicates a farthest distance from the sensor, or a median or an average of the detected data included in the history may be determined as the decision parameter. Alternatively, in case that the human presence sensor 1 is a motion sensor such as a pyroelectric sensor, the decision parameter to be determined may be a threshold (intensity of motion) for use in the decision at Step B4 in FIG. 3 (decision as to whether motion of an object to be detected is found within the detection coverage of the sensor). In this case, detected data included in the history indicating that motion of an object to be detected is weakest, or a median or an average of the detected data included in the history may be determined as the decision parameter.

As described above, according to the present embodiment, by automatically updating a decision parameter for use in the presence deciding processing based on a result of detection by the human presence sensor 1 and existence/nonexistence of an operation for an electronic apparatus, presence decision in which the condition of an object to be detected and a change of the surrounding environment are incorporated can be achieved to further reduce errors in presence decision.

(Third Embodiment)

Figure 6:
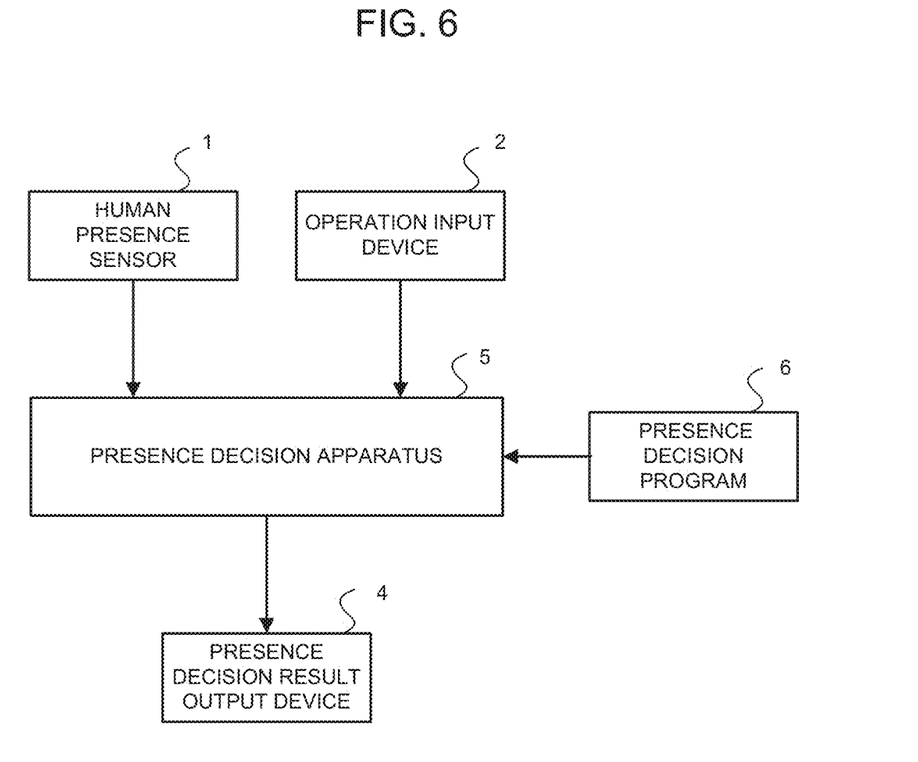
FIG. 6 is a block diagram of a presence decision system in accordance with a third embodiment of the present invention.

Next, a presence decision system in accordance with a third embodiment will be described with reference to the accompanying drawings. FIG. 6 is a block diagram of a presence decision system in accordance with the third embodiment of the present invention. In this embodiment, parts having similar functions to those of the first embodiment are designated by similar reference symbols, and description thereof will be omitted.

A presence decision apparatus 5 in the presence decision system in accordance with the third embodiment conducts the same processing as that by the presence decision apparatus 3 of the first embodiment or the presence decision apparatus 3A of the second embodiment by loading a presence decision program 6 and executing it.

The presence decision program 6 includes programs and data for controlling an operation of the presence decision apparatus 5. The presence decision apparatus 5 may acquire the presence decision program 6 by loading the program recorded in, for example, a recording medium, or acquire the presence decision program by downloading it from another computer via a network.

(Exemplary Embodiment)

Next, an exemplary embodiment in which the presence decision system of the first embodiment is implemented by a computer such as a personal computer will be described.

In this exemplary embodiment, the human presence sensor 1 includes a distance sensor installed in a lower portion of a display so that a user of the computer is encompassed within the sensing coverage of the sensor. Moreover, the operation input device 2 includes a keyboard and a mouse connected to the computer. The presence decision apparatus 3 and presence decision result output device 4 include a computer(s) including a central processing apparatus and a storage device. The presence decision result output device 4 implements a power-saving function for controlling the condition of a power source of the computer in response to a result of presence decision by the presence decision apparatus 3.

The presence decision system in this exemplary embodiment is for deciding whether a user of the computer is present in front of the keyboard connected to the computer.

The human presence sensor 1 is configured to output a value ranging from 0 (no object to be detected) to 255 (the object to be detected lies in close proximity of the sensor) depending upon the distance between the sensor and object to be detected.

The presence decision apparatus 3 acquires detected data by the human presence sensor 1 and operation data indicating existence or nonexistence of operation input to the operation input device 2 in a frequency of twice per second, and decides whether a user is present around the computer.

Figure 7:
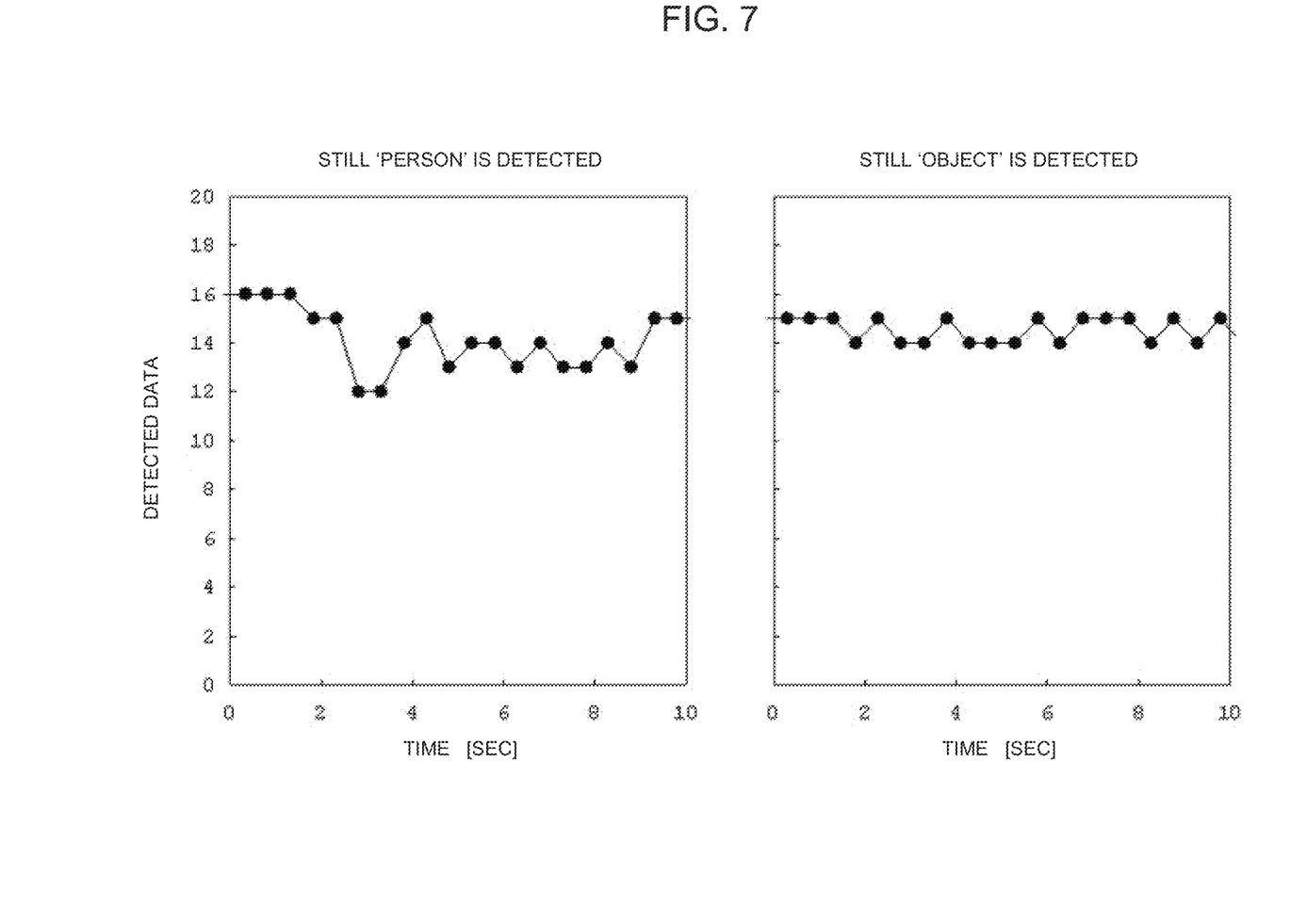
FIG. 7 is a diagram showing a temporal change of detected data by a human presence sensor.

FIG. 7 shows a temporal change of detected data by the human presence sensor 1 in case that the human presence sensor 1 correctly detects a user who is sitting on a chair in front of the keyboard connected to the computer and is operating the keyboard, and in case that the sensor 1 detects an obstacle lying at the position of the keyboard. As shown, although both the user and obstacle keep still, detected data for the user has somewhat greater a variation than that for the obstacle. This is because the body of a person using a computer is not completely motionless.

From such a tendency of detected data, at Step A1 of the validity deciding processing (FIG. 2), a threshold for the amplitude of variation of detected data of one or two for deciding motion of an object to be detected from detected data may be used to distinguish whether the object to be detected is a still matter (such as an obstacle) or a user. In case that operation input to the operation input device 2 exists even though it is decided that no motion is found based on the threshold, it may be assumed that some obstacle is present within the detection coverage of the human presence sensor 1 and the human presence sensor 1 cannot correctly detect a user, and thus, the detected data validity deciding section 33 decides validity of detected data as "invalid" (Step A2 in FIG. 2). By thus deciding validity of detected data obtained by the human presence sensor 1, the wrong decision that a user is present even though an obstacle lies within the detection coverage of the human presence sensor 1 and the presence of a user cannot be correctly detected due to the obstacle can be prevented, and reliability of a result of presence decision can be improved.

Based on a result decided by the presence decision apparatus 3, the presence decision result output device 4 turns on the power source of the computer in case that it is decided that a user is present, or turns off the power source of the display or brings the condition of the power source of the computer into a suspended state in case that it is decided that no user is present; thus, a power-saving function for reducing consumed power of the computer is implemented.

It should be noted that a value for use as the threshold for the amplitude of variation of the detected data is not limited to the value described above, and it may be any value insofar as it allows distinction whether the object to be detected is a still object or a user.

As described above, the presence decision system in accordance with the embodiments of the present invention may be implemented by a processor loading an operation program and the like stored in a memory or a recording medium and executing it, or may be configured in hardware. Only part of the functions of the embodiments described above may be implemented by a computer program.

While the present invention has been described with reference to the preferred embodiments above, the present invention is not necessarily limited to these embodiments, and may be practiced with various modifications within the scope of the technical concept thereof.

Part or all of the embodiments above may be described as in the following Appendices, although not limited thereto.

For example, at Step A1 of the detected data validity deciding processing by the detected data validity deciding section, a decision parameter stored in the decision parameter storage section 35 may be used as a threshold to be referred to in deciding whether motion of an object to be detected is found within the detection coverage of the human presence sensor 1.

(Appendix 1)

A presence decision apparatus characterized in comprising:

detected data validity deciding means for, from detected data indicating a result of detection by a sensor for detecting a presence of an object and operation data indicating existence or nonexistence of an operation input to a predetermined apparatus, deciding validity of said detected data; and presence deciding means for, from said detected data, said operation data, and a result of said decision of validity of said detected data, deciding whether a user is present around said predetermined apparatus.

(Appendix 2)

The presence decision apparatus as recited in appendix 1, characterized in that: said sensor includes a distance sensor for detecting a distance from said sensor to an object; and said detected data validity deciding means stores detected data acquired by said sensor, and decides that detected data acquired by said sensor is invalid in case that an amount of a change between a plurality of said detected data is equal to or smaller than a predetermined value and said operation data indicates that an operation input to said predetermined apparatus exists.

(Appendix 3)

The presence decision apparatus as recited in appendix 1 or 2, characterized in that said presence deciding means decides that presence of a user is unknown in case that said operation data indicates that no operation input to said predetermined apparatus exists, and a decision result of validity of said detected data by said detected data validity deciding means indicates invalidity.

(Appendix 4)

The presence decision apparatus as recited in appendix 1 or 2, characterized in that said presence deciding means outputs that a user is present when an operation input to said predetermined apparatus exists, in case that no operation input to said predetermined apparatus exists, outputs that whether a user is present is unknown when said detected data is invalid, and in case that no operation input to said predetermined apparatus exists, outputs that a user is present when said detected data is valid and an amount of a change of said detected data is greater than a predetermined value, and outputs that no user is present in case that said detected data is valid and an amount of a change of said detected data is smaller than a predetermined value.

(Appendix 5)

The presence decision apparatus as recited in appendix 1 or 2, characterized in that said presence deciding means outputs that a user is present when an operation input to said predetermined apparatus exists, in case that no operation input to said predetermined apparatus exists, outputs that whether a user is present is unknown when said detected data is invalid; or in case that no operation input to said predetermined apparatus exists, outputs that a user is present when said detected data is valid and an amount of a change of said detected data is greater than a predetermined value, and decides that a user is present in case that said detected data is valid and an amount of a change of said detected data is smaller than a predetermined value, and in case that a distance between a sensor and an object to be detected is smaller than a predetermined value, and decides that no user is present in case that said detected data is valid and an amount of a change of said detected data is smaller than a predetermined value, and in case that a distance between a sensor and an object to be detected is greater than a predetermined value.

(Appendix 6)

A presence decision method characterized in comprising:

a detected data validity deciding step of, from detected data indicating a result of detection by a sensor for detecting a presence of an object and, operation data indicating existence or nonexistence of an operation input to a predetermined apparatus, deciding validity of said detected data; and a presence deciding step of, from said detected data, said operation data, and a decision result of validity of said detected data, deciding whether a user is present around said predetermined apparatus.

(Appendix 7)

The presence decision method as recited in appendix 6, characterized in that said sensor includes a distance sensor for detecting a distance from said sensor to an object, and said detected data validity deciding step stores detected data acquired by said sensor, and decides that detected data acquired by said sensor is invalid in case that an amount of a change between a plurality of said detected data is equal to or smaller than a predetermined value and said operation data indicates that an operation input to said predetermined apparatus exists.

(Appendix 8)

The presence decision method as recited in appendix 6 or 7, characterized in that said presence deciding step decides that presence of a user is unknown in case that said operation data indicates that no operation input to said predetermined apparatus exists and a decision result of validity of said detected data by said detected data validity deciding step indicates invalidity.

(Appendix 9)

The presence decision method as recited in appendix 6 or 7, characterized in that said presence deciding step outputs that a user is present when an operation input to said predetermined apparatus exists, in case that no operation input to said predetermined apparatus exists, outputs that whether a user is present is unknown when said detected data is invalid, and in case that no operation input to said predetermined apparatus exists, outputs that a user is present when said detected data is valid and an amount of a change of said detected data is greater than a predetermined value, and outputs that no user is present in case that said detected data is valid and an amount of a change of said detected data is smaller than a predetermined value.

(Appendix 10)

The presence decision method as recited in appendix 6 or 7, characterized in that said presence deciding step outputs that a user is present when an operation input to said predetermined apparatus exists, in case that no operation input to said predetermined apparatus exists, outputs that whether a user is present is unknown when said detected data is invalid, and in case that no operation input to said predetermined apparatus exists, outputs that a user is present when said detected data is valid and an amount of a change of said detected data is greater than a predetermined value, and decides that a user is present in case that said detected data is valid and an amount of a change of said detected data is smaller than a predetermined value, and in case that a distance between a sensor and an object to be detected is smaller than a predetermined value, and decides that no user is present in case that said detected data is valid and an amount of a change of said detected data is smaller than a predetermined value, and in case that a distance between a sensor and an object to be detected is greater than a predetermined value.

(Appendix 11)

A program for causing a computer to execute:

detected data validity deciding processing of, from detected data indicating a result of detection by a sensor for detecting a presence of an object, and operation data indicating existence or nonexistence of an operation input to a predetermined apparatus, deciding validity of said detected data; and presence deciding processing of, from said detected data, said operation data, and a decision result of validity of said detected data, deciding whether a user is present around said predetermined apparatus.

(Appendix 12)

The program as recited in appendix 11, characterized in that:

said sensor includes a distance sensor for detecting a distance from said sensor to an object, and said detected data validity deciding processing stores detected data acquired by said sensor, and decides that detected data acquired by said sensor is invalid in case that an amount of a change between a plurality of said detected data is equal to or smaller than a predetermined value and said operation data indicates that an operation input to said predetermined apparatus exists.

(Appendix 13)

The program as recited in appendix 11 or 12, characterized in that said presence deciding processing decides that presence of a user is unknown in case that said operation data indicates that no operation input to said predetermined apparatus exists and a decision result of validity of said detected data by said detected data validity deciding processing indicates invalidity.

(Appendix 14)

The program as recited in appendix 11 or 12, characterized in that said presence deciding processing outputs that a user is present when an operation input to said predetermined apparatus exists, in case that no operation input to said predetermined apparatus exists, outputs that whether a user is present is unknown when said detected data is invalid, and in case that no operation input to said predetermined apparatus exists, outputs that a user is present when said detected data is valid and an amount of a change of said detected data is greater than a predetermined value, and outputs that no user is present in case that said detected data is valid and an amount of a change of said detected data is smaller than a predetermined value.

Appendix (15)

The program as recited in appendix 11 or 12, characterized in that said presence deciding processing outputs that a user is present when an operation input to said predetermined apparatus exists, in case that no operation input to said predetermined apparatus exists, outputs that whether a user is present is unknown when said detected data is invalid, and in case that no operation input to said predetermined apparatus exists, outputs that a user is present when said detected data is valid and an amount of a change of said detected data is greater than a predetermined value, and decides that a user is present in case that said detected data is valid and an amount of a change of said detected data is smaller than a predetermined value, and in case that a distance between a sensor and an object to be detected is smaller than a predetermined value, and decides that no user is present in case that said detected data is valid and an amount of a change of said detected data is smaller than a predetermined value, and in case that a distance between a sensor and an object to be detected is greater than a predetermined value.

While the present invention has been explained with reference to several embodiments and exemplary embodiment, the present invention is not limited to these embodiments and exemplary embodiment and may be practiced with various modifications within the scope of technical concept thereof. The present application claims priority based on Japanese Patent Application No. 2010-166649 filed on Jul. 26, 2010, the disclosure of which is incorporated herein in its entirety.

[Reference Signs List]

1 Human presence sensor
2 Operation input device
3, 3A, 5 Presence decision apparatus
4 Presence decision result output device
6 Presence decision program
31 Detected data acquiring section
32 Operation data acquiring section
33 Detected data validity deciding section
34 Presence deciding section
35 Decision parameter storage section
35 Decision parameter updating section

The invention claimed is:

1. A presence decision apparatus comprising:
   a processor;
   detected data validity deciding unit that, based on detected data indicating a result of detection by a sensor for detecting a presence of an object and, operation data indicating existence or nonexistence of an operation input to a predetermined apparatus, decides validity of said detected data; and
   presence deciding unit that, based on said detected data, said operation data, and a decision result of validity of said detected data, decides whether a user is present around said predetermined apparatus.

2. The presence decision apparatus according to claim 1, wherein
   said detected data validity deciding unit stores detected data acquired by said sensor, and decides that detected data acquired by said sensor is invalid in case that an amount of a change between a plurality of said detected data is equal to or smaller than a predetermined value and said operation data indicates that an operation input to said predetermined apparatus exists.

3. The presence decision apparatus according to claim 1, wherein
said presence deciding unit decides that presence of a user is unknown in case that said operation data indicates that no operation input to said predetermined apparatus exists, and a decision result of validity of said detected data by said detected data validity deciding unit indicates invalidity.

4. The presence decision apparatus according to claim 1, wherein
said presence deciding unit
outputs that a user is present when an operation input to said predetermined apparatus exists,
in case that no operation input to said predetermined apparatus exists, outputs that whether a user is present is unknown when said detected data is invalid, and
in case that no operation input to said predetermined apparatus exists, outputs that a user is present when said detected data is valid and an amount of a change of said detected data is greater than a predetermined value, and outputs that no user is present in case that said detected data is valid and an amount of a change of said detected data is smaller than a predetermined value.

5. The presence decision apparatus according to claim 1, wherein
said presence deciding unit
outputs that a user is present when an operation input to said predetermined apparatus exists,
in case that no operation input to said predetermined apparatus exists, outputs that whether a user is present is unknown when said detected data is invalid, and
in case that no operation input to said predetermined apparatus exists, outputs that a user is present when said detected data is valid and an amount of a change of said detected data is greater than a predetermined value, and decides that a user is present in case that said detected data is valid and an amount of a change of said detected data is smaller than a predetermined value, and in case that a distance between a sensor and an object to be detected is smaller than a predetermined value, and decides that no user is present in case that said detected data is valid and an amount of a change of said detected data is smaller than a predetermined value, and in case that a distance between a sensor and an object to be detected is greater than a predetermined value.

6. A presence decision method comprising:
a detected data validity deciding step of, based on detected data indicating a result of detection by a sensor for detecting a presence of an object, and operation data indicating existence or nonexistence of an operation input to a predetermined apparatus, deciding validity of said detected data; and
a presence deciding step of, based on said detected data, said operation data, and a decision result of validity of said detected data, deciding whether a user is present around said predetermined apparatus.

7. The presence decision method according to claim 6, wherein
said detected data validity deciding step stores detected data acquired by said sensor, and decides that detected data acquired by said sensor is invalid in case that an amount of a change between a plurality of said detected data is equal to or smaller than a predetermined value and said operation data indicates that an operation input to said predetermined apparatus exists.

8. The presence decision method according to claim 6, wherein
said presence deciding step decides that presence of a user is unknown in case that said operation data indicates that no operation input to said predetermined apparatus exists and a decision result of validity of said detected data by said detected data validity deciding step indicates invalidity.

9. The presence decision method according to claim 6, wherein
said presence deciding step
outputs that a user is present when an operation input to said predetermined apparatus exists;
in case that no operation input to said predetermined apparatus exists, outputs that whether a user is present is unknown when said detected data is invalid, and
in case that no operation input to said predetermined apparatus exists, outputs that a user is present when said detected data is valid and an amount of a change of said detected data is greater than a predetermined value, and outputs that no user is present in case that said detected data is valid and an amount of a change of said detected data is smaller than a predetermined value.

10. The presence decision method according to claim 6, wherein
said presence deciding step
outputs that a user is present when an operation input to said predetermined apparatus exists,
in case that no operation input to said predetermined apparatus exists, outputs that whether a user is present is unknown when said detected data is invalid, and
in case that no operation input to said predetermined apparatus exists, outputs that a user is present when said detected data is valid and an amount of a change of said detected data is greater than a predetermined value, and decides that a user is present in case that said detected data is valid and an amount of a change of said detected data is smaller than a predetermined value, and in case that a distance between a sensor and an object to be detected is smaller than a predetermined value, and decides that no user is present in case that said detected data is valid and an amount of a change of said detected data is smaller than a predetermined value, and in case that a distance between a sensor and an object to be detected is greater than a predetermined value.

11. A non-transitory computer readable storage medium storing a program for causing a computer to execute:
detected data validity deciding processing of, based on detected data indicating a result of detection by a sensor for detecting a presence of an object, and operation data indicating existence or nonexistence of an operation input to a predetermined apparatus, deciding validity of said detected data; and
presence deciding processing of, based on said detected data, said operation data, and a decision result of validity of said detected data, deciding whether a user is present around said predetermined apparatus.

12. The non-transitory computer readable storage medium according to claim 11, wherein
said detected data validity deciding processing stores detected data acquired by said sensor, and decides that detected data acquired by said sensor is invalid in case that an amount of a change between a plurality of said detected data is equal to or smaller than a predetermined value and said operation data indicates that an operation input to said predetermined apparatus exists.

13. The non-transitory computer readable storage medium according to claim 11, wherein
said presence deciding processing decides that presence of a user is unknown in case that said operation data indicates that no operation input to said predetermined apparatus exists and a decision result of validity of said detected data by said detected data validity deciding processing indicates invalidity.

14. The non-transitory computer readable storage medium according to claim 11, wherein
said presence deciding processing
outputs that a user is present when an operation input to said predetermined apparatus exists,
in case that no operation input to said predetermined apparatus exists, outputs that whether a user is present is unknown when said detected data is invalid, and
in case that no operation input to said predetermined apparatus exists, outputs that a user is present when said detected data is valid and an amount of a change of said detected data is greater than a predetermined value, and outputs that no user is present in case that said detected data is valid and an amount of a change of said detected data is smaller than a predetermined value.

15. The non-transitory computer readable storage medium according to claim 11, wherein
said presence deciding processing
outputs that a user is present when an operation input to said predetermined apparatus exists,
in case that no operation input to said predetermined apparatus exists, outputs that whether a user is present is unknown when said detected data is invalid, and
in case that no operation input to said predetermined apparatus exists, outputs that a user is present when said detected data is valid and an amount of a change of said detected data is greater than a predetermined value, and decides that a user is present in case that said detected data is valid and an amount of a change of said detected data is smaller than a predetermined value, and in case that a distance between a sensor and an object to be detected is smaller than a predetermined value, and decides that no user is present in case that said detected data is valid and an amount of a change of said detected data is smaller than a predetermined value, and in case that a distance between a sensor and an object to be detected is greater than a predetermined value.

* * * * *